United States Patent [19]

Muldner

[11] 4,190,981
[45] Mar. 4, 1980

[54] MAT FOR GROWING LAWNS OR OTHER VEGETATION

[76] Inventor: Lawrence C. Muldner, 13349 McCulloch Ave., Saratoga, Calif. 95070

[21] Appl. No.: 936,052

[22] Filed: Aug. 23, 1978

Related U.S. Application Data

[63] Continuation-in-part of Ser. No. 828,177, Aug. 26, 1977, abandoned.

[51] Int. Cl.² ............................................. A01G 31/00
[52] U.S. Cl. ............................................. 47/56; 47/9
[58] Field of Search .................................. 47/56, 74, 9

[56] References Cited

U.S. PATENT DOCUMENTS

| 2,826,865 | 3/1958 | Chohamin ........................... 47/56 |
| 2,876,588 | 3/1959 | Tietz et al. ......................... 47/56 X |
| 2,909,003 | 10/1959 | Marshall ............................ 47/56 |
| 2,923,093 | 2/1960 | Allen ................................. 47/56 |
| 3,080,681 | 3/1963 | Merrill et al. ...................... 47/56 |
| 3,284,209 | 11/1966 | Kelley ................................ 47/56 |
| 3,375,607 | 4/1968 | Melvold .............................. 47/74 |
| 3,704,544 | 12/1972 | Spanel et al. ....................... 47/56 |
| 3,733,745 | 5/1973 | Ingerstedt et al. ................. 47/56 X |
| 3,889,417 | 6/1975 | Wood et al. ........................ 47/56 X |
| 3,914,901 | 10/1975 | Muldner ............................. 47/56 |

FOREIGN PATENT DOCUMENTS

| 2150770 | 4/1973 | Fed. Rep. of Germany ............. 47/56 |
| 2438301 | 2/1976 | Fed. Rep. of Germany ............. 47/56 |
| 45-24803 | 8/1970 | Japan ................................... 47/56 |
| 891540 | 3/1962 | United Kingdom ................... 47/56 |
| 1030658 | 5/1966 | United Kingdom ................... 47/56 |
| 1041133 | 9/1966 | United Kingdom ................... 47/56 |

OTHER PUBLICATIONS

"Troyturf," American Nurseryman, vol. 115, No. 6, p. 93.

*Primary Examiner*—E. H. Eickholt

[57] ABSTRACT

A laminated mat for growing lawns or other vegetation on soil comprises a base sheet of water pervious, bio-degradable web material. Joined to the base sheet by an adhesive binder is a bed of seeds and dried, compressed peat particles. Secured to the bed of seeds and peat particles is an upper laminate comprising a fibrous, porous veil which protects and retains the bed therebelow. The upper veil is water pervious to pass water therethrough to the bed of peat particles and seeds. The bio-degradable veil also easily expands to retain the wet, expanded peat particles and the seeds entrained by the peat particles and the veil.

10 Claims, 5 Drawing Figures

FIG_1
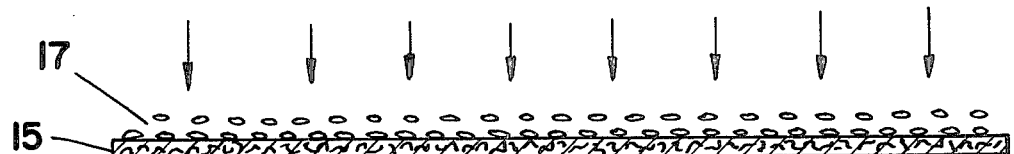
FIG_2
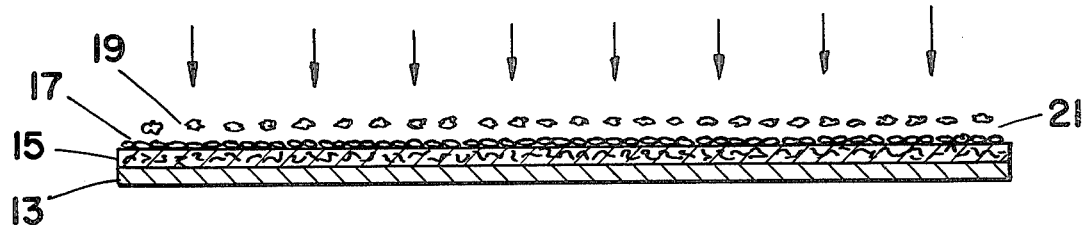
FIG_3
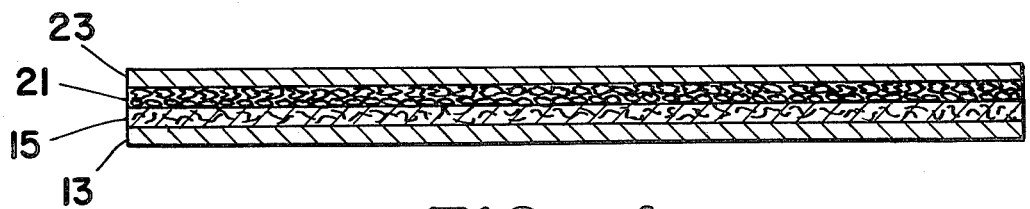
FIG_4
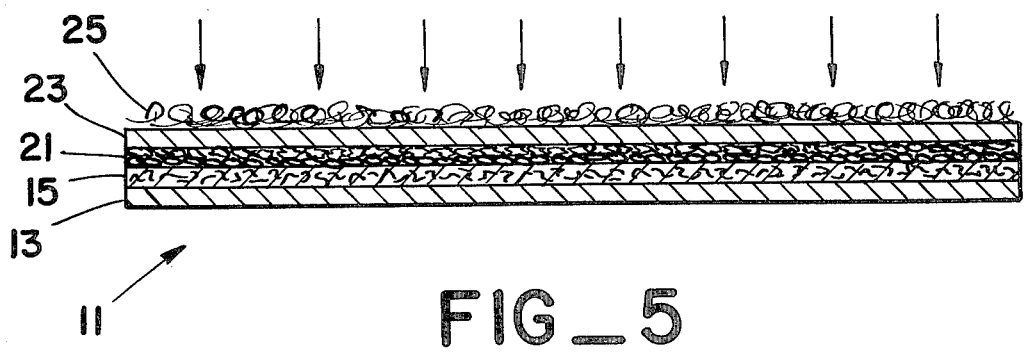
FIG_5

MAT FOR GROWING LAWNS OR OTHER VEGETATION

REFERENCE TO PREVIOUS APPLICATION

The instant application is a continuation-in-part of applicant's earlier filed application, Ser. No. 828,177, filed on Aug. 26, 1977, for AN IMPROVED MAT FORGROWING LAWNS AND OTHER VEGETATION and now abandoned.

BACKGROUND OF THE INVENTION

There is known in the prior art many forms of mat or carpet products which are intended for growing lawns and other forms of vegetation. These products generally include some sort of fibrous material which provides structural integrity to the mat, and a mulch material which is often mixed with the seeds to be germinated. These products also include some form of joining these various materials together, including stitching, adhesives, and the like. Generally speaking, these products have not gained wide acceptance due to failures in some aspects of their designs.

For example, most mulch material used in these products expands upon watering. Often, the expansion of the mulch material breaks whatever bond is provided with the fibrous structural material of the mat, with the result that significant portions of the mulch and seed mixture are washed away from the mat. Stitching methods for joining the materials to form a mat tend to limit the expansion of the mulch material, forming an irregular surface and also decreasing the survival rate of the germinating seeds.

Also, many of the prior art mat products fail to protect properly the seeds during the germinating and sprouting periods. As the seeds are covered by a thin layer of mulch material, they are prey to birds, winds, and rain, and the deleterious effects of strong sunlight.

SUMMARY OF THE PRESENT INVENTION

The present invention generally comprises an improved mat for growing lawns or other vegetation upon soil. It is characterized by an unique construction which retains the mulch material after it is watered and expanded, and which also allows free water flow therethrough. Also, the construction of the present invention protects the seeds and mulch material during the vital germination and sprouting periods.

The construction of the mat of the present invention includes a base sheet of web material which is easily degradable upon wetting, and which quickly becomes part of the underlying soil. An adhesive binder joins a bed of seeds mixed with dried, compressed peat particles to the base sheet. The peat particles are also pre-screened to remove smaller particles and dust which interfere with the adhesion of the binder.

Joined to the top of the bed of seeds and peat particles by an adhesive binder is a fibrous veil comprising an unwoven, porous fabric formed of bio-degradable synthetic fibers. The veil is bonded to the bed of seeds and peat particles to provide structural integrity to the mat after the mat has been placed on soil and watering has substantially dissolved the base sheet.

The fibrous veil serves other important functions. It protects the seeds and seedlings from direct sunlight, and also greatly ameliorates the eroding effects of wind, water, and the like. The veil is particularly characterized by its ability to expand laterally in concert with the expanding wetted peat particles, so that the particles and seeds are well secured during the germination and sprouting phases.

After the mat is applied to a soil surface, water is applied either by irrigation or natural rain-fall to initate swelling of the peat particles, which subsequently surround and protect the germinating seeds. The water passes through the fibrous veil and the bed of seeds and peat particles as well as the base sheet, the base sheet quickly dissolving. The sprouting seeds easily may send roots through the deteriorated base sheet, and may send shoots upwardly through the fibrous veil. The fibrous veil biodegrades after a period of months, after seedlings are well established in the underlying soil.

A BRIEF DESCRIPTION OF THE DRAWINGS

FIG. 1 illustrates a base sheet and an adhesive material used in forming the improved mat of the present invention.

FIG. 2 illustrates the application of seed to the structure shown in FIG. 1.

FIG. 3 illustrates the application of compressed, screened peat particles to the structure shown in FIG. 2.

FIG. 4 illustrates the structure of FIG. 3 after the application of adhesive material over the bed of seeds and compressed peat particles of the structure shown in FIG. 3.

FIG. 5 illustrates the improved mat of the present invention after the application of the fibrous veil to the structure as shown in FIG. 4.

DESCRIPTION OF THE PREFERRED EMBODIMENT

The present invention generally comprises a mat like laminated structure 11, as shown in FIG. 5, which is adapted to grow lawns or similar vegetation on a soil surface. The mat 11 includes seeds of the desired vegetation, a mulch material which provides protection for the seeds and a growth medium for the seeds, and structural material which maintains the integrity of the mat and protects the seeds and mulch during germination and sprouting of the seeds.

The mat 11 comprises laminated layers of selected materials which are assembled in a sequence depicted in FIGS. 1–5. As shown in FIG. 1, the fabricaton of the mat 11 begins with a base sheet 13, which comprises a biodegradable material. In the preferred embodiment, the base sheet 13 is formed of light tissue paper weighing 8 to 11 pounds per three thousand square feet. The tissue paper is mechanically roughed or scarfed to increase the bonding thereto of subsequent laminations. Also, the tissue paper may be perforated to increase water flow through the mat 11.

It should be noted that the tissue paper provides substantial structural integrity to the mat 11 prior to use of the product. However, after the mat is emplaced and watered, the tissue paper base sheet 13 deteriorates rapidly, losing a substantial portion of its strength upon initial wetting.

An adhesive binder material 15 is then applied to the scarfed surface of the base sheet 13. Preferably, the adhesive binder comprises a water base rubber adhesive compound which is easily bio-degradable and which provides a high tack factor. The water base adhesive losing most of its binder properties upon wetting. The adhesive material 15 is sprayed onto the base sheet by conventional techniques.

Next, seeds 17 of the desired kind of vegetation are dispersed upon the adhesive material 15, as shown in FIG. 2. Following this step, particles of dried, compressed peat 19 are spread in a thin layer over the adhesive binder 15 and the seed layer 17 to form a bed 21 of seeds mixed with the compressed peat particles. The peat particles are formed by first drying the peat to a moisture content of 20% or less, and then compressing the peat to form dense cylinders. The cylinders are then cut up and passed through a cylinder or hammer mill to form particles of compressed peat. The particles are screened on ⅛ inch mesh to obtain particles in the size range of 1/16th to ⅜th inch. The screening step removes smaller, dust-like particles which would otherwise be absorbed by the adhesive binder and would reduce the adhesion of the laminations.

It should be noted that upon wetting, dried peat expands greatly. If the compressed peat particles are larger than the aforementioned size range, they will expand upon watering to produce an uneven and irregular upper surface. Further, dried, compressed peat forms a lamination which is structurally superior to that which is formed by undried or loose peat. Also, the dried peat increases the shelf life of the mat 11, as it does not provide sufficient moisture for germination of the seeds 17.

Another adhesive binder material layer 23 is then applied over the bed 21 of seeds and peat particles, as shown in FIG. 4. This adhesive binder material may also comprise a water base rubber adhesive, or any other similar adhesive material.

As shown in FIG. 5, a fibrous veil of unwoven fabric having a cotton like texture is then applied to the adhesive layer 23. The adhesive material 23 binds the fibrous veil 25 to the bed 21 of seeds and dried, compressed peat particles. The veil 25 serves a multitude of functions in the mat 11 of the present invention. The fibers of the mat permit water to pass therethrough, while protecting the bed 21 from destruction from excessive water runoff or high winds. Also, the fibrous veil 25 controls evaporation of water from the bed 21 so that a moist growing medium is maintained. The veil also protects the seeds from direct sun, and helps prevent severe temperature changes in the bed 21.

An important characteristic of the veil 25 is that it is easily laterally expandable. As the peat particles are wetted and caused to expand, the fibrous veil 25 expands with the particles to retain and protect the peat particles and the seeds.

In the preferred embodiment, the fibrous veil has a loft ranging between ⅛th inch and ¼th inch, this loft being sufficient to retain the expanding peat particles within its non-woven structure. The veil is composed of biodegradable synthetic fibers having a denier of approximately 6½, and a weight in the range of 4 10s per ounce per square yard to 8 10s per ounce per square yard. The synthetic fibers are biodegradable in a period 12 to 18 months after planting, so that the seedlings are well established before the veil disintegrates. It may be appreciated that the germinating seedlings may easily pass through the unwoven fibers of the veil, while the roots of the germinating seedlings easily may pass through the peat particles and tissue paper to penetrate the soil therebelow.

The light absorption associated with the color of the fibers forming the fibrous veil may be very important in areas having extreme climates. In locales having hot climates and little water, the fibers may be white to reflect a substantial portion of incident sunlight and prevent the mat 11 from overheating and damaging the seeds. Conversely, in cold climates, the fibers may be a dark color or black to absorb more sunlight and maintain a temperature in the mat sufficient to foster germination.

The mat of the present invention is easily used to form a lawn or the like merely by unrolling the mat onto a prepared soil surface and then watering the mat. Upon watering, the tissue paper base sheet begins to degrade immediately, and the dried peat particles expand to several times their dry size. The fibrous veil 25 expands with the peat particles, providing the structural strength to maintain the bed 21 as an integral unit while the seeds begin to germinate. It should be noted that after the initial watering, the fibrous veil provides the primary structural strength for the mat 11, although the loft, nonwoven nature, and placement of the veil above the bed 21 provides this structural function without any interference with the germination and rooting of the seeds.

The finished mat 11 weighs approximately 15 to 20 pounds per one hundred square feet. This relatively light weight is due to the use of light materials compressed, dried peat particles, and facilitates easy handling of large pieces of the mat 11 when configured in a spiral wound roll.

I claim:

1. An improved laminated mat for growing vegetation on soil, comprising,
    an outer lower base sheet laminate of water pervious web material, said material being quickly biodegradable to become part of the soil after coming in contact therewith;
    a bed of seeds and dried, compressed peat particles, wherein said peat particles are treated to remove dust entrained therewith, means for adhesively securing said bed to said base sheet, said particles being expandable upon wetting to surround and form a mulch for said seeds; and
    an outer upper veil laminate of fibrous, unwoven, porous web material and means for adhesively securing said veil to said bed, said veil comprising means for expanding with said expandable peat particles and retaining said particles and seeds integrally in said mat after biodegradation of said base sheet, said veil being slowly biodegradable to become part of the soil after germination and rooting of said seeds.

2. An improved laminated mat for growing vegetation on soil, comprising
    an outer lower base sheet laminate of water pervious web material, said material being quickly biodegradable upon wetting,
    a bed of seeds and peat particles, said peat particles being formed of peat which is dried, compressed to form a dense solid mass, said solid mass being broken into particles which are screened to select a predetermined particle size range,
    means for adhesively securing said bed to said base sheet, said particles being expandable upon wetting to surround and form a mulch for said seeds; and
    an outer upper veil laminate of fibrous, unwoven, porous web material and means for adhesively securing said veil to said bed, said veil comprising means for expanding with said expandable peat particles and retaining said particles and seeds integrally in said mat after biodegradation of said base sheet, said veil being slowly biodegradable to become part of the soil after germination and rooting of said seeds.

3. The mat of claim 1 or 2, wherein said dried, compressed peat particles range in size from 1/16 inch to ⅜ inch.

4. The mat of claim 1 or 2, wherein said peat particles contain approximately 20% moisture or less.

5. The mat of claim 1 or 2, wherein said veil has a loft of ⅛ inch to ¼ inch.

6. The mat of claim 1 or 2, wherein said veil biodegrades 12 to 18 months after said mat is placed on the soil.

7. The mat of claim 1 or 2, wherein said base sheet comprises tissue paper weighing 8 to 11 pounds per 3000 square feet.

8. The mat of claim 1 or 2, wherein said mat weighs approximately 15 to 20 pounds per 100 square feet.

9. The mat of claim 1 or 2, wherein said veil includes means for controlling the absorption of incident sunlight and maintaining a proper temperature range in said bed for germination of said seeds.

10. The mat of claim 1 or 2, wherein said means for adhesively securing comprises a water base adhesive material which dissolves upon wetting.

* * * * *